United States Patent
Smith et al.

(10) Patent No.: US 11,858,202 B2
(45) Date of Patent: Jan. 2, 2024

(54) SYSTEM AND METHOD FOR PERFORMING LASER POWDER BED FUSION USING CONTROLLED, SUPPLEMENTAL IN SITU SURFACE HEATING TO CONTROL MICROSTRUCTURE AND RESIDUAL STRESSES IN FORMED PART

(71) Applicant: Lawrence Livermore National Security, LLC, Livermore, CA (US)

(72) Inventors: William Smith, Oakland, CA (US); Gabriel M. Guss, Manteca, CA (US); Manyalibo Joseph Matthews, Livermore, CA (US); Joseph T. McKeown, Pleasanton, CA (US); John Roehling, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 387 days.

(21) Appl. No.: 16/365,029

(22) Filed: Mar. 26, 2019

(65) Prior Publication Data
US 2020/0306884 A1    Oct. 1, 2020

(51) Int. Cl.
*B29C 64/153*    (2017.01)
*B23K 26/342*    (2014.01)
(Continued)

(52) U.S. Cl.
CPC ............ *B29C 64/153* (2017.08); *B22F 10/28* (2021.01); *B22F 10/38* (2021.01); *B22F 12/10* (2021.01);
(Continued)

(58) Field of Classification Search
CPC .... B23K 26/342; B23K 26/066; B23K 26/60; B23K 26/0608; B23K 26/0626;
(Continued)

(56) References Cited

U.S. PATENT DOCUMENTS

2015/0034604 A1*   2/2015   Subramanian ............ B22F 7/02
                                                                                219/76.12
2017/0021419 A1    1/2017   Ng et al.
(Continued)

FOREIGN PATENT DOCUMENTS

WO    WO-2014071135 A1    5/2014

OTHER PUBLICATIONS

International Search Report and Written Opinion regarding International Application No. PCT/US2020/023282, dated Jul. 8, 2020.
(Continued)

*Primary Examiner* — John J Norton
*Assistant Examiner* — Simpson A Chen
(74) *Attorney, Agent, or Firm* — HARNESS, DICKEY & PIERCE, P.L.C.

(57) ABSTRACT

The present disclosure relates to an additive manufacturing system for forming a part using a powder material. In one embodiment the system makes use of a primary heat generating subsystem to generate a fusing beam for heating and fusing at least one of select portions of a powder layer, or an entire area of a powder layer, deposited on a build plate. The system also incorporates a beam steering subsystem for steering the fusing beam over the powder layer. A supplemental heating subsystem is used to generate a wide area beam to heat a portion of the powder layer either prior to fusing, along with the fusing operation, or subsequent to fusing of the powder with the fusing beam. The wide area beam has an intensity which is insufficient to fuse the powder, and alters a microstructure of the powder layer as the powder layer is at least one of fused or as it cools, to thus relieve stress in the part.

16 Claims, 3 Drawing Sheets

Figure 1:
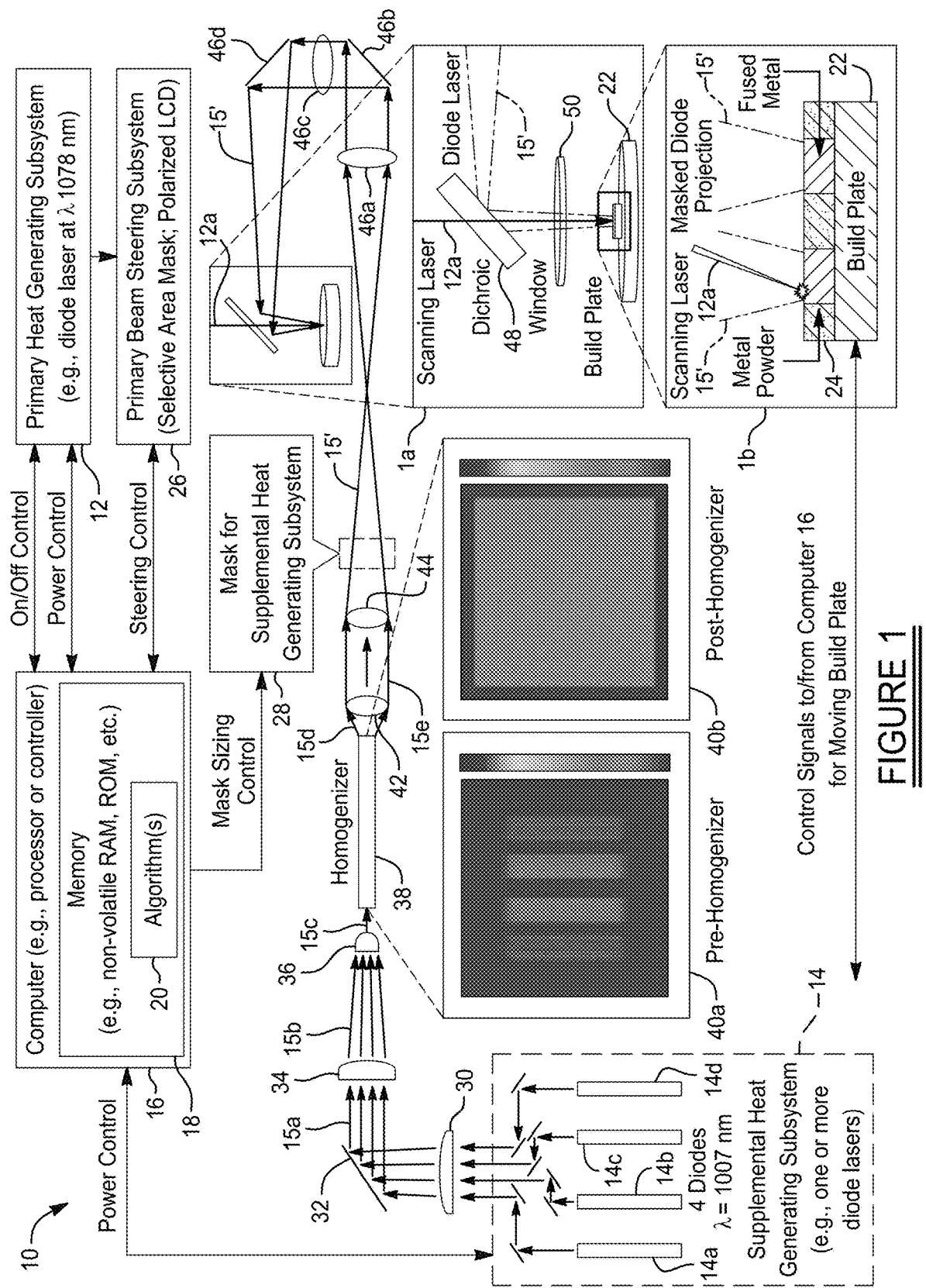

(51) Int. Cl.

| | |
|---|---|
| *B33Y 30/00* | (2015.01) |
| *B33Y 10/00* | (2015.01) |
| *B33Y 50/02* | (2015.01) |
| *B23K 26/06* | (2014.01) |
| *B23K 26/066* | (2014.01) |
| *B23K 26/073* | (2006.01) |
| *B23K 26/08* | (2014.01) |
| *B23K 26/60* | (2014.01) |
| *B22F 10/28* | (2021.01) |
| *B22F 12/10* | (2021.01) |
| *B22F 12/41* | (2021.01) |
| *B22F 12/45* | (2021.01) |
| *B22F 10/38* | (2021.01) |
| *B22F 12/44* | (2021.01) |
| *B22F 12/49* | (2021.01) |
| *B22F 10/36* | (2021.01) |
| *B22F 10/368* | (2021.01) |

(52) U.S. Cl.
CPC .............. *B22F 12/41* (2021.01); *B22F 12/45* (2021.01); *B23K 26/066* (2015.10); *B23K 26/0608* (2013.01); *B23K 26/0626* (2013.01); *B23K 26/0643* (2013.01); *B23K 26/0648* (2013.01); *B23K 26/073* (2013.01); *B23K 26/0884* (2013.01); *B23K 26/342* (2015.10); *B23K 26/60* (2015.10); *B33Y 10/00* (2014.12); *B33Y 30/00* (2014.12); *B33Y 50/02* (2014.12); *B22F 10/36* (2021.01); *B22F 10/368* (2021.01); *B22F 12/49* (2021.01)

(58) Field of Classification Search
CPC ............ B23K 26/0643; B23K 26/0648; B23K 26/073; B23K 26/0884; B33Y 10/00; B33Y 30/00; B33Y 50/02
USPC ........................................................ 219/76.1
See application file for complete search history.

(56) References Cited

U.S. PATENT DOCUMENTS

| | | | | |
|---|---|---|---|---|
| 2017/0059529 | A1 | 3/2017 | Kamel et al. | |
| 2017/0144224 | A1* | 5/2017 | DeMuth | B33Y 70/00 |
| 2017/0216966 | A1* | 8/2017 | DeMuth | B29C 64/273 |
| 2017/0217093 | A1 | 8/2017 | DeMuth et al. | |
| 2018/0141160 | A1* | 5/2018 | Karp | B23K 26/082 |
| 2018/0161925 | A1* | 6/2018 | Harding | B33Y 50/02 |
| 2019/0193329 | A1* | 6/2019 | Haraguchi | B22F 10/20 |

OTHER PUBLICATIONS

J-P Kruth, J. Deckers, E. Yasa, R. Wauthle, Assessing and comparing influencing factors of residual stresses in selective laser melting using a novel analysis method, Int. Mech. Engrs. 226(6) 980-991.

F. Abe, K. Osakada, M. Shiomi, K. Uematsu, M. Matsumoto. The manufacturing of hard tools from metallic powders by selective laser melting. Journal of Materials Processing Technology, 111(1-3) 210-213, (2001).

N.W. Klingbeil, J.L. Beuth, R.K. Chin, C.H. Amon. Measurement and modeling of residual stress-induced warpage in direct metal deposition processes. Proceedings of the Solid Freeform Fabrication Symposium, 367-374, (1998).

P. Vora, K. Mumtaz, I. Todd, N. Hopkinson. AlSi12 In-Situ Alloy Formation and Residual Stress Reduction using Anchorless Selective Laser Melting. Additive Manufacturing, 7, 12-19, (2015).

B.S. El-Dasher, A. Bayramian, J.A. Demuth, J.C. Farmer, S.G. Torres, System and Method for High Power Diode Based Additive Manufacturing, US20140252687A1, 2014. https://patents.google.com/patent/US20140252687A1 (accessed Aug. 31, 2018).

J.F. Bille, S.I. Brown, 3-dimensional laser beam guidance system, U.S. Pat. No. 4,901,718, 1990.

D.D. Gu, W. Meiners, K. Wissenbach, R. Poprawe, Laser additive manufacturing of metallic components: materials, processes and mechanisms, Int. Mater. Rev. 57 (2012) 133-164. doi:10.1179/1743280411Y.0000000014.

Multiple material systems for selective beam sintering, 1989. https://patents.google.com/patent/US4944817A/en (accessed Aug. 31, 2018).

M.J. Matthews, G. Guss, D.R. Drachenberg, J.A. Demuth, J.E. Heebner, E.B. Duoss, J.D. Kuntz, C.M. Spadaccini, Diode-based additive manufacturing of metals using an optically-addressable light valve, Opt. Express. 25, 11788-11800 (2017). doi:10.1364/OE.25.011788.

T.T. Roehling, et al. Modulating laser intensity profile ellipticity for microstructural control during metal additive manufacturing, Acta Materialia 128 (2017) 197.

K. Alrbaey, D. Wimpenny et al. On optimization of surface roughness of selective laser melted stalinless steel parts: A statistical study, *Journal of Materials Engineering Performance* 23 (2014) 2139.

K. A. Mumtaz, N. Hopkinson, Selective Laser Melting of thin wall parts using pulse shaping, Journal of Material Processing Technology 210 (2010) 279.

A. Diatlov, D. Buchbinder, W. Meiners, K. Wissenbach, J. Bultmann, Towards surface topography: Quantification of Selective Laser Melting (SLM) built parts, Innovative Developments on Virtual and Physical Prototyping (2012) 595.

K. Hagihara, T. Nakano, M. Suzuki, T. Ishimoto, Suyalatu, S.-H. Sun, Successful additive manufacturing of MoSi2 including crystallographic texture and shape control, Journal of Alloys and Compounds 696 (2017) 67.

M.M. Kirka, K.A. Unocic, N. Raghavan, F. Medina, R.R. Dehoff, S.S. Babu, Microstructure development in electron beam-melted Inconel 718 and associated tensile properties, JOM 68 (2016) 1012.

W.-C. Huang, K.-P. Chang, P.-H. Wu, C.-H. Wu, C.-C. Lin, C.-S. Chuang, D.-Y. Lin, S.-H. Liu, J. B. Horng, F.-H. Tsau, 3D printing optical engine for controlling material microstructure, Physics Procedia 83 (2016) 847.

M.J. Matthews, G. Guss, D.R. Drachenberg, J.A. Demuth, J.E. Heebner, E.B. Duoss, J.D. Kuntz, C.M. Spadaccini, Diode-based additive manufacturing of metals using an optically-addressable light valve, Optics Express 25 (2017) 11788.

M. Zavala-Arredondo, N. Boone, J. Willmott, D.T.D. Childs, P. Ivanov, K.M. Groom, K.A. Mumtaz, Laser diode area melting for high speed additive manufacturing of metallic components, Materials & Design 117 (2017) 305.

D. Wang, Y. Liu, Y. Yang, D. Xiao, Theoretical and experimental study on surface roughness of 316L stainless steel metal parts obtained through selective laser melting, Rapid Prototyping Journal 22 (2016) 706.

G. Pyka, G. Kerckhofs, I. Papantoniou, M. Speirs, J. Schrooten, M. Wevers, Surface roughness and morphology customization of additive manufactured open porous Ti6Al4V structures, Materials 6 (2013) 4737.

Hu. Xiao, S. Li, X. Han, J. Mazumder, L. Song, Laves phase control of Inconel 718 alloy using quasi-continuous-wave laser additive manufacturing, Materials & Design 122 (2017) 330.

M.P. Sealy, G. Madireddya, C. Lib, Y.B. Guob, Finite element modeling of hybrid additive manufacturing by laser shock peening, Proceedings of the 27th Annual International Solid Freeform Fabrication Symposium, ed. by D. Bourell (2016).

N. Kalentics, E. Boillat, P. Peyre, S. Ciric-Kostic, N. Bogojevic, R.E. Logé, Tailoring residual stress profile of Selective Laser Melted parts by Laser Shock Peening, Additive Manufacturing 16 (2017) 90.

Y. Liao, S. Suslov, C. Ye, G.J. Cheng, The mechanisms of thermal engineered laser shock peening for enhanced fatigue performance, Acta Materialia 60 (2012) 4997.

C. Ye, Y. Liao, S. Suslov, D.Y. Lin, G.J. Cheng, Ultrahigh dense and gradient nano-precipitates generated by warm laser shock peening for combination of high strength and ductility, Materials Science and Engineering A 609 (2014) 195.

(56) References Cited

OTHER PUBLICATIONS

S. Khairallah, A.T. Anderson, A.M. Rubenchik, W.E. King, Laser powder-bed fusion additive manufacturing: Physics of complex melt flow and formation mechanisms of pores, spatter, and denudation zones, Acta Materialia 108 (2016) 36.
W.E. King, H.D. Barth, V.M. Castillo, G.F. Gallegos, J.W. Gibbs, D.E. Hahn, C. Kamath, A.M. Rubenchik, Observation of keyhole-mode laser melting in laser powder-bed fusion additive manufacturing, Journal of Materials Processing Technology 214 (2014) 2915.
M.R. Dorr, J.-L. Fattebert, M.E. Wickett, J.F. Belak, P.E.A. Turchi, A numerical algorithm for the solution of a phase-field model of polycrystalline materials, Journal of Computational Physics 229 (2010) 626.
J.-L. Fattebert, M.E. Wickett, P.E.A. Turchi, Phase-field modeling of coring during solidification of Au—Ni alloy using quaternions and CALPHAD input, Acta Materialia 62 (2014) 89.
A.G. Khachaturyan, Theory of Structural Transformations in Solids (John Wiley & Sons, New York, 1983).
S. Bhattacharyya, T.W. Heo, K. Chang, L.-Q. Chen, A spectral iterative method for the computation of effective properties of elastically inhomogeneous polycrystals, Communications in Computational Physics 11 (2012) 726.
T.W. Heo, S. Bhattacharyya, L.-Q. Chen, A phase-field model for elastically anisotropic polycrystalline binary solid solutions, Philosophical Magazine 93 (2013) 1468.
T.W. Heo, L.-Q. Chen, Phase-field modeling of displacive phase transformations in elastically anisotropic and inhomogeneous polycrystals, Acta Materialia 76 (2014) 68.
G. Sheng, S. Bhattacharyya, H. Zhang, K. Chang, S.L. Shang, S.N. Mathaudhu, Z.-K. Liu, L.-Q. Chen, Effective elastic properties of polycrystals based on phase-field description, Materials Science and Engineering A 554 (2012) 67.
D.C. Hofmann, S. Roberts, R. Otis, J. Kolodziejska, R.P. Dillon, J.-O. Suh, A.A. Shapiro, Z.-K. Liu, J.-P. Borgonia, Developing gradient metal alloys through radial deposition additive manufacturing, Scientific Reports 4 (2014) Article No. 5357.
B. Lu, D. Li, X. Tian, Development trends in additive manufacturing and 3D printing, Engineering 1 (2015) 085.
Y.-L. Hao, S.-J. Li, R. Yang, Biomedical titanium alloys and their additive manufacturing, Rare Metals 35 (2016) 661.
V. Ocelik, N. Jannsen, S.N. Smith, J.Th.M. de Hosson, Additive manufacturing of high-entropy alloys by laser processing, JOM 68 (2016) 1810.
H. Springer, C. Baron, A. Szczepaniak, E.A. Jägle, M.B. Wilms, A. Weisheit, D. Raabe, Efficient additive manufacturing production of oxide- and nitride-dispersion-strengthened materials through atmospheric reactions in liquid metal deposition, Materials & Design 111 (2016) 60.
M.Z. Ibrahim, A.A.D. Sarhan, F. Yusuf, M. Hamdi, Biomedical materials and techniques to improve the tribological, mechanical and biomedical properties of orthopedic implants—A review article, Journal of Alloys and Compounds 714 (2017) 636.
A. Plotkowski, O. Rios, N. Sridharan, Z. Sims, K. Unocic, R.T. Ott, R.R. Dehoff, S.S. Babu, Evaluation of an Al—Ce alloy for laser additive manufacturing, Acta Materialia 126 (2017) 507.
A.E. Gheribi, C. Robelin, S. Le Digabel, C. Audet, A.D. Pelton, Calculating all local minima on liquidus surfaces using the FactSage software and databases and the Mesh Adaptive Search algorithm, Journal of Chemical Thermodynamics 43 (2011) 1323.
A.E. Gheribi, C. Audet, S. Le Digabel, E. Bélisle, C.W. Bale, A.D. Pelton, Calculating optimal conditions for alloy and process design using thermodynamic and property databases, the FactSage software and the Mesh Adaptive Direct Search algorithm, CALPHAD 36 (2012) 135.
J.-P. Harvey, A.E. Gheribi, Process simulation and control optimization of a blast furnace using classical thermodynamics combined to a direct search algorithm, Metallurgical and Materials Transactions B B45 (2014) 307.
E. Bélisle, Z. Huang, S. Le Digabel, A.E. Gheribi, Evaluation of machine learning interpolation techniques for prediction of physical properties, Computational Materials Science 98 (2015) 170.
B. Cantor, I.T.H. Chang, P. Knight, A.J.B. Vincent, Microstructural development in equiatomic multicomponent alloys, Materials Science and Engineering A A375-377 (2004) 213.
J.-W. Yeh, S.-K. Chen, S.-J. Lin, J.-Y. Gan, T.-S. Chin, T.-T. Shun, C.-H. Tsau, S.-Y. Chang, Nanostructured high-entropy alloys with multiple principal elements: Novel alloy design concepts and outcomes, Advanced Engineering Materials 6 (2004) 299.
M.C. Gao, D.E. Alman, Searching for next single-phase high-entropy alloy compositions, Entropy 15 (2013) 4504.
Y. Zhang, T.-T. Zuo, Z. Tang, M.C. Gao, K.A. Dahmen, P.K. Liaw, Z.-P. Lu, Microstructures and properties of high-entropy alloys, Progress in Materials Science 61 (2014) 1.
Y.F. Ye, Q. Wang, J. Lu, C.T. Liu, Y. Yang, High-entropy alloy: challenges and prospects, Materials Today 19 (2016) 349.
Z.C. Sims, D. Weiss, S. McCall, M.A. McGuire, R.T. Ott, T. Geer, O. Rios, P.E.A. Turchi, Cerium-based, intermetallic-strengthened aluminum casting alloy: High-volume co-product development, JOM 68 (2016) 1940.
C.-Z. Quan, L. Zhang, X. Wang, Y.-L. Li, Correspondence between microstructural evolution mechanisms and hot processing parameters for Ti—13Nb—13Zr biomedical alloy in comprehensive processing maps, Journal of Alloys and Compounds 698 (2016) 178.
L. Battezzati, A.L. Greer, The viscosity of liquid metals and alloys, Acta Metallurgica 37 (1989) 1791.
A.T. Dinsdale, P.N. Quested, The viscosity of aluminum and its alloys—A review of data and models, Journal of Materials Science 39 (2004) 7221.
G. Kaptay, A unified equation for the viscosity of pure liquid metals, Zeitschrift für Metallkunde 96 (2005) 1.
O.K. Echendu, B.C. Anusionwu, An investigation of the viscosities of various groups of liquid metals, African Review of Physics 6 (2011) 35.
H. Kobatake, J. Schmitz, J. Brillo, Density and viscosity of ternary Al—Cu—Si liquid alloys, Journal of Materials Science 49 (2014) 3541.
W. Gasior, Viscosity modeling of binary alloys: Comparatibve studies, CALPHAD 44 (2014) 119.
Y.A. Odusote, Thermodynamic and dynamical properties of liquid Al—X (X=Sn, Ge, Cu) systems, Journal of Non-Crystalline Solids 402 (2014) 96.
F. Zhang, Y. Du, S. Liu, W. Jie, Modeling of the viscosity in the Al—Cu—Mg—Si system: Database construction, 49, (2015).
Y.-B. Kang, Relationship between surface tension and Gibbs energy, and application of constrained Gibbs energy minimization, CALPHAD 50 (2015) 23.
Y.-B. Kang, Calculation of surface tension using CALPHAD software as a zero phase fraction line of "surface" phase, CALPHAD 50 (2015) 105.
D.J. Thoma, J.H. Perepezko, Microstructure trasitions during containerless processing of undercooled Fe—Ni alloys, Metallurgical Transactions A A23 (1992) 1347.
C. Kenel, C. Leinenbach, Influence of cooling rate on microstructure formation during rapid solidification of binary TiAl alloys, Journal of Alloys and Compounds 637 (2015) 242.
C. Kenel, C. Leinenbach, Influence of Nb and Mo on microstructure formation of rapidly solidified ternary Ti—Al—(Nb, Mo) alloys, Intermetallics 69 (2016) 82.
W. Kurz, B. Giovanola, R. Trivedi, Theory of microstructural development during rapid solidification, Acta Metallurgica 34 (1986) 823.
R. Trivedi, P. Magnin, W. Kurz, Theory of eutectic growth under rapid solidification conditions, Acta Metallurgica 35 (1987) 971.
R. Trivedi, W. Kurz, Dendritic growth, International Materials Reviews 39 (1994) 49.
S.C. Gill, W. Kurz, Rapidly solidified Al—Cu alloys—II. Calculation of the microstructure selection map, Acta Metallurgica et Materialia 43 (1995) 139.
S. Fukumoto, W. Kurz, The $\delta$ to $\gamma$ transition in Fe—Cr—Ni alloys during laser treatment, ISIJ International 37 (1997) 677.

(56) References Cited

OTHER PUBLICATIONS

J.T. McKeown, K. Zweiacker, C. Liu, D.R. Coughlin, A.J. Clarke, J.K. Baldwin, J.W. Gibbs, J.D. Roehling, S.D. Imhoff, P.J. Gibbs, D. Tuourret, J.M.K. Wiezorek, G.H. Campbell, Time-resolved in situ measurements during rapid alloy solidification: Experimental insight for additive manufacturing, JOM 68 (2016) 985.

M. Rombouts, L. Froyen, A.V. Gusarov, E.H. Bentefour, C. Glorieux, Photopyroelectric measurement of thermal conductivity of metallic powders, Journal of Applied Physics 97 (2005) 024905.

J.A. Slotwinski, E.J. Garboczi, K.M. Hebenstreit, Porosity measurements and analysis for metal additive manufacturing process control, Journal of Research of the National Institute of Standards and Technology 119 (2014) 494.

D. Lévesque, L. Dubourg, A. Blouin, Laser ultrasonics for defect detection and residual stress measurement of friction stir welds, Nondestructive Testing and Evaluation 26 (2011) 319.

K.A. Fisher, J.V. Candy, G. Guss, M.J. Matthews, Evaluating acoustic emission signals as an in situ process monitoring technique for Selective Laser Melting (SLM) (LLNL Report, LLNL-TR-706659, 2016).

\* cited by examiner

SYSTEM AND METHOD FOR PERFORMING LASER POWDER BED FUSION USING CONTROLLED, SUPPLEMENTAL IN SITU SURFACE HEATING TO CONTROL MICROSTRUCTURE AND RESIDUAL STRESSES IN FORMED PART

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to additive manufacturing (AM) systems and methods, and more particularly to laser powder bed fusion systems and methods which incorporate a controllable supplemental heating subsystem which is used in situ, during manufacture of a part, to control the microstructure and residual stresses present in the finished part.

BACKGROUND

This section provides background information related to the present disclosure which is not necessarily prior art.

There are two major areas, in particular, where a surface heating profile will have a large effect on an additive manufacturing (AM) process, namely residual stress and microstructure. With regards to metal processing in general, it will be appreciated that microstructure has a strong influence on the mechanical properties of a metal. Smaller grains will increase the mechanical strength, and particular phases can have higher strength or ductility. Also, the local composition can affect the movement of defects through the metal, possibly increasing strength or even decreasing the fatigue lifetime.

Microstructure formation occurs during liquid-solid (solidification) or solid-solid transformations. Solidification is largely a product of the temperature gradient and solidification rate of the molten metal. A low temperature gradient, but fast solidification rate, allows small metal crystals to grow out of the liquid and solidify into an equiaxed (equal-axes) microstructure. Such a solidification results in smaller grains, isotropic properties, and generally superior mechanical properties, as compared to a columnar structure where the metal grows from the existing solid. Microstructure formation during solid-solid phase transformation can introduce stronger but more brittle phases, as well as volume changes that induce residual stresses. Reducing the cooling rate completely avoids these transformations, improving mechanical properties and eliminating some residual stress.

Residual stresses are present in most metal processing methods but are particularly large in AM systems which make use of laser powder bed fusion (LPBF), as compared to that of conventionally cast or forged metals. This is due to higher temperature gradients inherent to the LPBF process. The formation of residual stress typically stems from non-uniform thermal expansion, resulting in counteracting tensile and compressive stresses within a part. These stresses are largely relieved upon removing the part from the build plate, causing the part to deform from its original shape. However, residual stresses can sometimes become large enough in a LPBF process to induce cracking and partial mechanical failure in the as-built parts.

Many attempts have been made to gain better control over the temperature gradients that occur during manufacture of a part using the LPBF process. Typically these attempts are made with the intention of reducing residual stress or controlling the microstructure. The simplest way to remove residual stresses is to post-anneal the part in an oven, but this adds considerable time to processing. In addition, a suitably sized oven has to be available to accommodate the part, which may pose an issue if large parts are being made with the LPBF process.

Previously used In-situ methods of controlling temperature gradients have included optimizing the laser scan strategy, implementing two lasers in series, heating the build chamber, or heating the build plate. Each of these attempts has various drawbacks, not the least of which involve performance limitations, the cost of the additional equipment needed, or both.

SUMMARY

This section provides a general summary of the disclosure, and is not a comprehensive disclosure of its full scope or all of its features.

In one aspect the present disclosure relates to an additive manufacturing system for forming a part using a powder material. The system may comprise a computer and a primary heat generating subsystem responsive to the computer for generating a fusing beam. The fusing beam is used for heating and fusing at least one of select portions of a powder layer, or an entire area of a powder layer, deposited on a build plate. A beam steering subsystem is included which is responsive to the computer for steering the fusing beam over the powder layer deposited on the build plate. A supplemental heating subsystem is included for generating a wide area beam to heat a portion of the powder layer at least one of prior to fusing of the powder with the fusing beam, simultaneously with fusing of the powder with the fusing beam, or even subsequent to fusing of the powder with the fusing beam. The wide area beam has an intensity which is insufficient to fuse the powder and operates to alter a microstructure of the powder layer as the powder layer is at least one of fused, or as the powder layer cools, to relieve stress in the part.

In another aspect the present disclosure relates to an additive manufacturing system for forming a part using a laser powder bed fusion manufacturing process. The system may comprise a computer and a primary heat generating subsystem responsive to the computer for generating a fusing beam. The fusing beam is used for heating and fusing at least one of select portions of a powder laid down to form a powder layer on a build plate, or an entire area of the powder layer deposited on the build plate. A beam steering subsystem is included responsive to the computer for steering the fusing beam over the powder layer deposited on a build plate. A supplemental heating subsystem is included for generating a wide area beam to heat a portion of the powder layer. The wide area beam may be generated either prior to fusing of the powder with the fusing beam, simultaneously with fusing of the powder with the fusing beam, or even subsequent to fusing of the powder with the fusing beam. The wide area beam has an intensity which is insufficient to fuse the powder. The system may further include a mask subsystem which is responsive to signals from the computer. The mask subsystem controls at least one of a dimension and a shape of the wide area beam during application of the wide area beam to the powder layer. The wide area beam has an intensity which is controlled by the computer and which operates to alter a microstructure of the powder layer as the powder layer is at least one of fused, or as the powder layer cools, to relieve stress in the part.

In still another aspect the present disclosure relates to a method for forming a part in a layer by layer process using a powdered feedstock material. The method may comprise using a primary heat generating subsystem to generate a fusing beam for heating and fusing at least one of select portions of a powder layer formed using the powdered feedstock material, or an entire area of the powder layer, deposited on a build plate. The method may further involve using a beam steering subsystem responsive to the computer for steering the fusing beam over the powder layer deposited on a build plate, and also using a supplemental heating subsystem generate a wide area beam to heat a portion of the powder layer. The supplemental heating subsystem may heat the portion of the powder layer either prior to fusing of the portion of the powder layer with the fusing beam, or simultaneously with fusing of the portion of the powder layer with the fusing beam, or even subsequent to fusing of the portion of the powder layer with the fusing beam. The method may further involve controlling the wide area beam such that the wide area beam has an intensity which is insufficient to fuse the powdered feedstock material, and such that the wide area beam alters a microstructure of the powder layer as the powder layer is at least one of fused, or as the powder layer cools, to relieve stress in the part.

Further areas of applicability will become apparent from the description provided herein. The description and specific examples in this summary are intended for purposes of illustration only and are not intended to limit the scope of the present disclosure.

DRAWINGS

Figure 2:
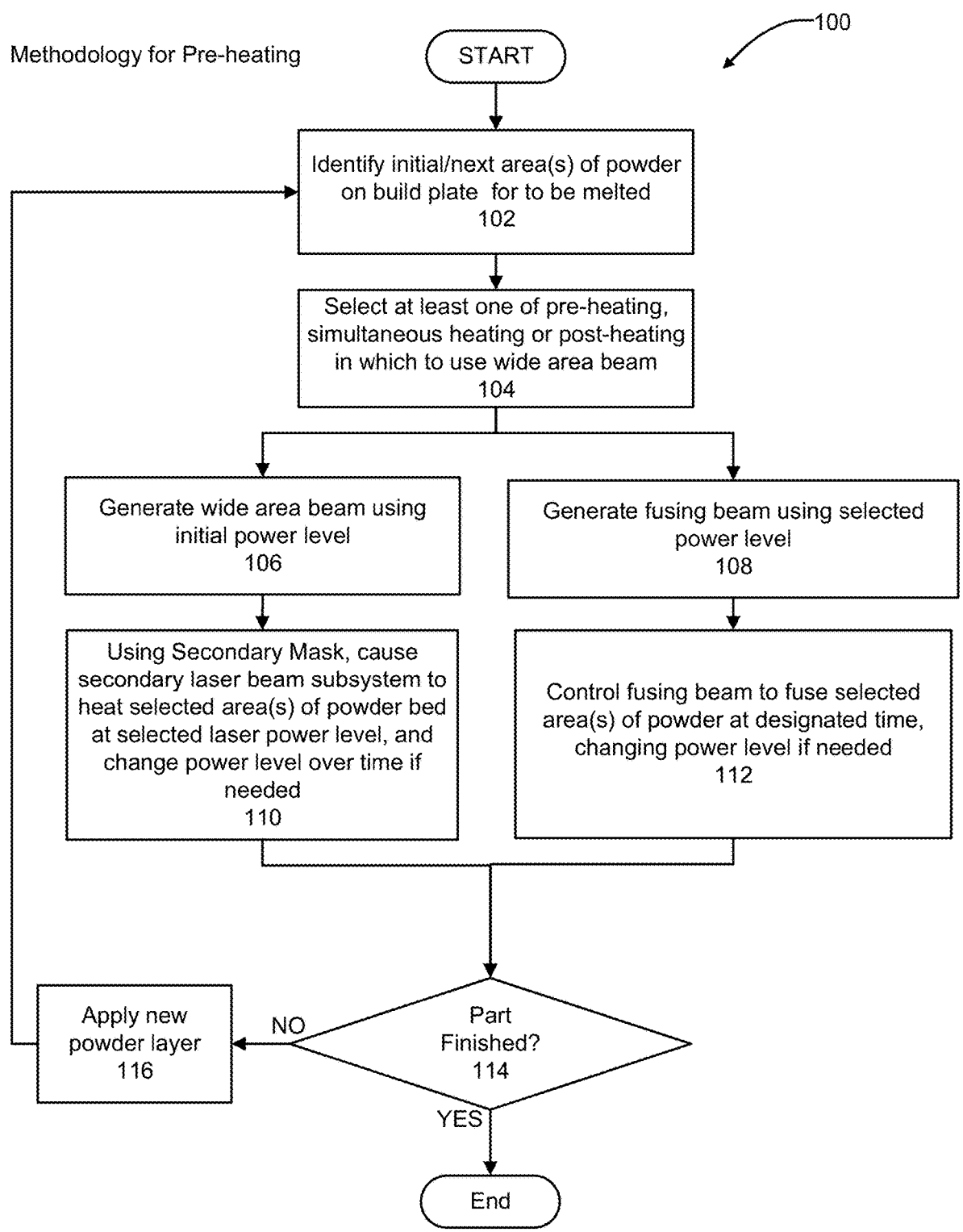
Figure 3:
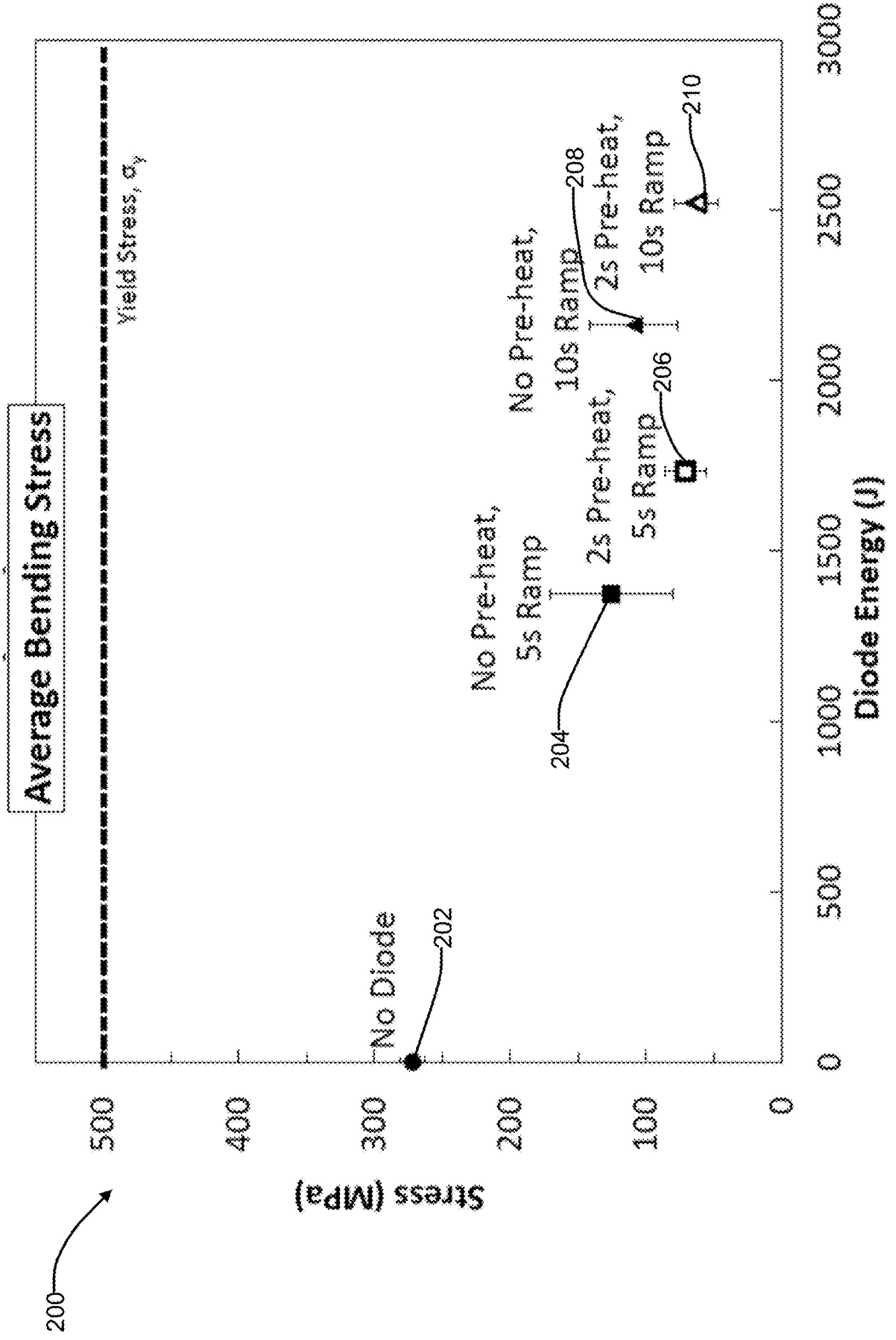

The drawings described herein are for illustrative purposes only of selected embodiments and not all possible implementations, and are not intended to limit the scope of the present disclosure. In the drawings:

FIG. 1 is a high level block diagram of one embodiment of an additive manufacturing system in accordance with the present disclosure;

FIG. 2 is a flowchart illustrating one example of major operations that may be performed by the system of FIG. 1 in carrying out an additive manufacturing operation using the system; and FIG. 3 is a graph illustrating the average bending stress (in MPa) of parts created using the system of FIG. 1, using different no supplemental pre-heating, and using a two seconds of supplemental pre-heating with both five and 10 second ramps (in this graph the term "ramp" refers to the duration of the power decrease of the wide area beam from maximum power to zero).

Corresponding reference numerals indicate corresponding parts throughout the several views of the drawings.

DETAILED DESCRIPTION

Example embodiments will now be described more fully with reference to the accompanying drawings.

The present disclosure, in the various embodiments discussed below, relates to systems and methods to control the thermal history of AM material by supplemental surface heating of the powdered material being built into a finished part. More particularly, the various embodiments and methodologies discussed below involve using a supplemental, wide area heating subsystem with a tailored intensity profile to heat the part either prior to, during or even after, fusing of the powder material takes place. In one embodiment a tailored intensity profile may be used with the supplemental heating subsystem. The supplemental heating reduces the thermal gradients present in the material as the powder being used to form the part is being fused by a primary heating system (e.g., fusing laser). The thermal history can be further controlled by ramping down the tailored (e.g., selected) heat/illumination provided by the supplemental heating subsystem over time to reduce the cooling rate of the material. The thermal control gained leads to better control over the formation of microstructure and residual stress in the finished part, rather than what may be achieved by just using a localized laser alone during the fusing of select portions of the powdered material to form the part.

Controlling the thermal history of a metal during additive manufacturing in the localized fashion highlighted by this invention allows very close control over both the microstructural formation and the residual stresses in the completed part.

Referring to FIG. 1, a system 10 in accordance with one embodiment of the present disclosure is shown. The system 10 in this example may include a primary heat generating subsystem 12, a supplemental heat generating subsystem 14 and a computer or electronic controller 16 (hereinafter simply "computer 16") for controlling the on/off operation and power levels applied by each of the primary and supplemental heat generating subsystems 12 and 14, respectively. The primary heat generating subsystem 12 may be formed by a laser, for example a diode laser or any other form of laser suitable for melting powdered material in a laser powder bed fusion (LPBF) process. For convenience, the primary heat generating subsystem 12 will be referred to simply as the "primary laser subsystem 12" throughout the following discussion.

The supplemental heat generating subsystem 14, in one example, is formed using a diode laser subsystem made up of four independent diode lasers 14a-14d emitting beams at a selected wavelength (e.g., in one example at $\lambda=1007$ nm). The supplemental heat generating subsystem 14, which will be referred to simply as "supplemental heating subsystem 14", generates a wide area beam 15'. The wide area beam 15' may be selected to illuminate the entire build area or just a selected portion of the build area. By the term "build area" it is meant the area on a build plate 22 where powder layer 24, for example metal powder, may be deposited. In contrast, a fusing beam 12a produced by the primary laser subsystem 12, which is used to perform the fusing of the powder layer 24, may be a significantly smaller diameter beam than the wide area beam 15', and in some instances only 10% or less of the diameter of the wide area beam. In one example the wide area beam 15' may be a circle having a diameter of about 1.0" while the fusing beam 12a may have a diameter of only about 1 mm, or even less. These are only provided as examples, and the precise shape and/or diameter of the fusing beam 12a and the shape and/or dimension of the wide area beam 15' will be selected to meet the needs of a specific application.

The power level used for the wide area beam 15' may be any desired power level. More specifically, the power level and intensity profile of a build may be selected to best fit the specific needs of the application. This allows for full control of the thermal history of the build process.

The computer 16 may include a memory 18 (which may also be an independent or external memory), which is preferably a non-volatile memory such as RAM, ROM, etc. The memory 18 may be used to store one or more algorithms 20 for controlling power levels applied by the primary laser subsystem 12 and/or controlling movement of the build plate 22, or possibly even movement of primary laser subsystem 12 and/or movement of the supplemental heating subsystem 14. The algorithms 20 may also include power control algorithms for controlling both the power (i.e., intensity) of the primary laser subsystem 12 and/or the supplemental heating subsystem 14. If movement of the primary laser subsystem 12 and/or the supplemental heating subsystem 14 is needed, then suitable mechanisms will need to be incorporated to enable the highly controlled movement of the primary laser subsystem 12 and/or the supplemental heating subsystem 14. It is expected that in most implementations, it will be preferable to control movement of the build plate 22 when forming the part, in which case a suitable mechanism (not shown) responsive to control signals from the computer 16 (or a different computer or controller/processor) may be used to move the build plate 22.

The system 10 may further incorporate a primary beam steering subsystem 26, responsive to steering control signals from the computer 16, for steering the fusing beam 12a as needed to fuse selected portions (or even an entire area) of the powder layer 24. The primary beam steering subsystem 26 may include mirrors or any suitable means for steering the fusing beam 12a. For example, the system disclosed in U.S. Pat. No. 9,308,583 to El-Dasher et al., issued Apr. 12, 2016, and assigned to the assignee of the present disclosure, which is hereby incorporated by reference, may potentially be used in whole or in part to form the primary beam steering subsystem 26. Primary laser subsystem 12 is also responsive to On/Off control signals from the computer 16, as well as power control signals for controlling its power output. An electronically controllable mask 28, responsive to control signals from the computer 16 (or a separate computer/processor), may be used to control the size (e.g., diameter) and/or shape of the wide area beam 15' as the wide area beam is used during formation of the part. The mask 28 may be as simple as a metal plate with a hole cut out or as sophisticated as an optically addressable light valve, akin to those manufactured by Meadowlark Optics of Frederick, Colorado. In either case, these masks act as a filter for the wide area laser, selectively allowing only a desired pattern to pass though and emit onto the build plate 22 at any given time.

The system 10 may further incorporate a first focusing optic 30 for focusing the four independent beams from the diodes lasers 14a-14d to a smaller beam 15a. A mirror 32 may be used to turn the beam 15a and direct it into a second focusing optic 34, which further focuses the beam 15a to produce smaller diameter beam 15b. The beam 15b is directed into a third focusing element 36 to focus the portions of the beam 15b so the beam portions substantially fully overlap, and create an even small diameter beam 15c. The beam 15c is directed into a conventional beam homogenizer 38 that evens out the intensity of the 15c from an uneven intensity (representative illustration 40a) to a substantially uniform intensity (representative illustration 40b) beam 15d. A fourth focusing optic 42 may be used to enlarge the beam 15d to a predetermined size or diameter to create beam 15e. A fifth focusing optic 44, if needed, may be used to further resize the beam 15e before the beam is received by the mask subsystem 28. The mask subsystem 28 may be responsive to mask sizing and/or shaping control signals from the computer 16 and may be used to control the size and/or shape of the beam 15e to produce the wide area beam 15', which is used to provide the supplemental heating to all or just a select subportion(s) of the powder layer 24. Optical components 46a, 46b, 46c and 46d may be used to redirect the wide area beam 15' onto the build plate 22.

Enlarged window 1a in FIG. 1 further illustrates that the wide area beam 15' may be redirected using a dichroic optic 48 through a window 50 onto the build plate 22. The dichroic optic 48 allows the fusing beam 12a to pass through without any interference onto the powder layer 24 disposed on the build plate 22. The power level of the wide area beam 15' may be controlled by suitable control signals from the computer 16, but the intensity of the wide area beam 15' is not sufficient to fuse the powder of the powder layer 24.

It will be appreciated that while in the embodiment illustrated in FIG. 1, the supplemental heating subsystem 14 has the diode lasers 14a-14d operating at a wavelength of $\lambda=1007$ nm and the primary laser subsystem 12 using a diode laser operating at $\lambda=1078$ nm, that the operating wavelengths need not be different, but could be the same. Furthermore, while the system 10 is shown with the fusing beam 12a and the wide area beam 15' being coaxial, the two beams need not necessarily be coaxial. Additionally, using properly selected optics, the projection of the wide area beam 15' can be scaled to cover large areas, only requiring an adjustment in diode laser beam intensity to maintain an adequate flux at the site being illuminated. With total control of the intensity, location, and timing of the wide area beam 15', a user is given unprecedented control of the thermal history of the LPBF process. The localized nature of this heating method is more efficient than merely heating an entire build chamber or heating the build plate 22.

Enlarged window 1b of FIG. 1 illustrates the mask subsystem 28 being used in two different ways: to project the wide area beam 15' onto a subportion of the powder layer 24 to provide supplemental heating, while the fusing beam 12a simultaneously illuminates and fuses a much smaller portion of the powder layer 24 within the region being illuminated by the wide area beam 15'. The enlarged window 1b of FIG. 1 also shows the wide area beam 15' being used to pre-heat (or even post-heat) an area outside of the portion of the powder layer 24 that is being heated using the fusing beam 12a. Accordingly, it will be appreciated that the supplemental heating of the powder layer 24 provided by the wide area beam 15' may be performed 1) prior to applying the fusing beam 12a to the same portion of the powder layer 24, or 2) simultaneously with application of the fusing beam 12a, or 3) even after the fusing beam 12a has finished fusing a portion of the powder layer and has been moved to a different location of the powder layer. Optionally, it is also possible that the wide area beam 15' may be used in different ways on different portions of a given powder layer 24. For example, one or more portions of the powder layer 24 may be illuminated simultaneously using both the fusing beam 12a and the wide area beam 15', while one or more other areas of the same powder layer are either pre-heated or post-heated using the wide area beam 15'. Or alternatively, application of the fusing beam 12a may only partially overlap, in time, the application of the wide area beam 15' to a given section/portion of the powder layer 24. Still further, the size of the wide area beam 12' and or its intensity (i.e., its power level) may be varied at different locations on a given powder layer 24, and these factors may be controlled in connection with the pre-heating, the simultaneous heating, or the post-heating operations described above. In various embodiments, both pre-heating and a degree of post-heating may be performed, with the power level of the wide area beam 15' being ramped down over a predetermined time after the fusing beam 12a has finished a fusing operation, to thus reduce the cooling rate of the part. The desired structural characteristics of the part will dictate, at least in part, exactly how the wide area beam 15' is to be used.

Referring to FIG. 2, a flowchart 100 is shown illustrating high level operations that may be performed by the system 10 in creating a part from a quantity of powdered material (e.g., metal or plastic powdered material). At operation 102 the system 10 identifies an initial (or next) area of the powder layer 24 on the build plate 22 to be melted. At operation 104 the computer 16 may select at least one area of the powder layer 24 for pre-heating, simultaneous heating or post-heating, using the wide area beam 15'. At operation 106 the wide area beam 15' may then be generated by turning on the supplemental heating subsystem 14. Either before, simultaneously with, or subsequent to generating the wide area beam 15', the fusing beam 12a may be generated using the primary laser subsystem 12, as indicated at operation 108. The fusing beam 12a may be generated using a fixed or variable power level selected by the computer 16, or it may simply use a predetermined, fixed power level. At operation 110 the mask subsystem 28 may be controlled to dimension the wide area beam 15' as needed and to heat one or more desired subportions (or even an entirety) of the powder layer 24, at the selected power level. If a variable power level is incorporated into the system 10, then the power level may be changed as needed by appropriate control signals from the computer 16 to the primary laser subsystem 12. The fusing beam 12a may be used at operation 112, along with the primary beam steering subsystem 26, to fuse one or more selected areas of the powder layer 24 (or even the entire powder layer), by using a designated power level. The fusing may be accomplished either shortly after the wide area beam 15' has been applied for a designated pre-heating time duration to a given area of the powder layer 24, or simultaneously with the wide area beam 15' such that both the wide area beam 15' and the fusing beam 12a are both acting on the same subportion of the powder layer 24, or even prior to applying the wide area beam 15'.

At operation 114, a check may be made by the computer 16 if all the layers of the part have been formed and, if not, at operation 116 a new powder layer 24 may be laid down over the just-formed layer, and then operations 102-116 repeated. Once the computer 16 detects that all layers of the part have been formed, the process ends.

Referring to FIG. 3, a graph 200 is shown to illustrate the reduction in residual stress of a stainless steel part made using the system 10. Point 202 indicates the highest stress where no diode laser pre-heating was used. Point 204 indicates a significant reduction in the residual stress in the part when no pre-heating was applied, but an application of a five second ramp down of the wide area beam 15' was applied after the powder was fused. By "ramp down" it is meant the wide area beam 15' was applied at a selected intensity and then ramped down to zero over the designated time. Point 206 indicates a further reduction of the residual stress present in the part when two seconds of pre-heating and a five second ramp down heating signal were applied using the wide area beam 15'. Point 208 indicates the residual stress level using no-preheating and a ten second ramp down application of the wide area beam 15'. Lastly, point 210 indicates the stress level at a minimum when both two seconds of pre-heating and 10 seconds of ramped down post-heating was used.

The various embodiments of the present disclosure thus disclose systems and methods for controlling the thermal history of AM material (e.g., powder, such as metal powder, plastic powder, etc.) by surface heating the material being built using a selected intensity profile from a supplemental heat source. The residual stresses and microstructure of the formed part can be altered by heating the underlying material with the selected intensity profile applied with the wide area beam 15' before, during or even after the fusing beam 12a melts/heats the powdered material, thereby reducing the thermal gradients present in the material. The thermal history can be further controlled by ramping down the selected illumination intensity of the wide area beam 15' over a relatively short time (e.g., on the order of seconds or less) to reduce the cooling rate of the powdered material. This thermal control of the part as the part cools leads to significantly better control over the formation of microstructure and residual stress than what can be achieved using the fusing laser 12a alone.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An additive manufacturing system for forming a part using a powder material, the system comprising:
   a computer configured to generate an electronic mask sizing control signal;
   a primary heat generating subsystem responsive to the computer for generating a fusing beam for heating and fusing at least one of a plurality of select portions of a powder layer, or an entire area of a powder layer, deposited on a build plate;
   a beam steering subsystem responsive to the computer, and including a first mask, for steering the fusing beam over the powder layer deposited on the build plate;
   a supplemental heating subsystem for generating a wide area beam to heat a portion of the powder layer;
   the supplemental heating subsystem including a second mask forming a portion of a computer controllable mask subsystem, the computer controllable mask subsystem being responsive to the electronic mask sizing control signal from the computer and configured to control a dimension and a shape of the wide area beam independently of the fusing beam, to enable illuminating two selected areas of the powder layer on the build plate with differing selected intensities and different beam coverage areas, through use of the wide area beam and the fusing beam;
   the computer controlling the supplemental heating subsystem while simultaneously controlling the primary heat generating subsystem, and further such that the supplemental heating subsystem heats the portion of the powder layer at least one of:
      prior to fusing of powder of the powder layer with the fusing beam;
      simultaneously with fusing of the powder of the powder layer with the fusing beam; or
      subsequent to fusing of the powder of the powder layer with the fusing beam;
   the wide area beam being of an intensity which is insufficient to fuse the powder layer; and
   the wide area beam operating to alter a microstructure of the powder layer as the powder layer is at least one of:
      fused by the fusing beam, or
      as the powder layer cools after being fused by the fusing beam,
         to relieve stress in the part produced by thermal gradients created during operation of the fusing beam fusing the powder layer, and to control an overall thermal history of the powder layer while being acted on by the fusing beam and the wide area beam.

2. The system of claim 1, wherein the supplemental heating subsystem is controlled by the computer to generate the wide area beam at selected times.

3. The system of claim 1, wherein the supplemental heating subsystem comprises a diode laser.

4. The system of claim 1, wherein the supplemental heating subsystem comprises a plurality of diode lasers.

5. The system of claim 1, wherein the supplemental heating subsystem is controlled to generate the wide area beam and the fusing beam both prior to, and concurrently with, application of the fusing beam to the powder layer.

6. The system of claim 1, wherein the supplemental heating subsystem is controlled to generate the wide area beam and the fusing beam simultaneously, and to maintain illumination of the wide area beam on a select area of the powder layer after the fusing beam has fused the select area and been turned off.

7. The system of claim 1, wherein the supplemental heating subsystem is controlled to generate and apply the wide area beam to at least a select area of the powder layer prior to the fusing beam being used to begin fusing the select area, and during fusing of the select area, and after fusing of the select area is completed.

8. The system of claim 1, further comprising a beam homogenizer configured to receive an output from the supplemental heating subsystem and to impart a uniform intensity to the wide area beam.

9. An additive manufacturing system for forming a part using a laser powder bed fusion manufacturing process, the system comprising:
   a computer configured to generate a mask sizing control signal;
   a primary heat generating subsystem including a diode laser responsive to the computer for generating a fusing beam having a first power level for heating and fusing at least one of a plurality of select portions of a powder laid down to form a powder layer on a build plate, or an entire area of the powder layer deposited on the build plate;
   a beam steering subsystem including a first electronically controllable mask, and being responsive to the computer, for steering the fusing beam over the powder layer deposited on the build plate;
   a supplemental heating subsystem for generating a wide area beam having a second power level lower than the first power level, to heat a desired portion of the powder layer;
   the supplemental heating subsystem including a second electronically controllable mask, controlled by the computer independently of the first digitally controllable mask through the mask sizing control signal supplied from the computer, the mask sizing control signal configured to control a size and a pattern of the wide area beam independently of generation and control of the fusing beam, and the computer further configured to supply a power control signal to the supplemental heating subsystem to provide control over the second power level, to enable simultaneously illuminating two independent areas of the powder layer on the build plate with differing selected intensities created by the first and second power levels associated with the fusing beam and the wide area beam, respectively;

the computer controlling the supplemental heating subsystem simultaneously while controlling operation of the primary heat generation subsystem and the beam steering subsystem, and the supplemental heating subsystem further being configured to heat the desired portion of the powder layer at least one of:

prior to fusing of the powder with the fusing beam;

simultaneously with fusing of the powder with the fusing beam; or subsequent to fusing of the powder with the fusing beam;

the wide area beam being of an intensity which is insufficient to fuse the powder; and the wide area beam having an intensity controlled by the computer through the power control signal applied to the supplemental heating subsystem, and operating to alter a microstructure of the powder layer as the powder layer is at least one of fused, or as the powder layer cools, to relieve stress in the part caused by heating created by the fusing beam, and to control an overall thermal history of the powder layer while being acted on by the fusing beam and the wide area beam.

10. The system of claim 9, wherein the supplemental heating subsystem is controlled by the computer to generate the wide area beam to illuminate at least one of the select portions of the powder layer while the fusing beam is fusing the at least one of the select portions.

11. The system of claim 9, wherein the supplemental heating subsystem is controlled by the computer to generate the wide area beam and begin illuminating at least one of the select portions of the powder layer prior to using the fusing beam to begin fusing the at least one of the select portions.

12. The system of claim 9, wherein the supplemental heating subsystem is controlled by the computer to generate the wide area beam and begin illuminating at least one of the select portions of the powder layer prior to using the fusing beam to begin fusing the at least one of the select portions, and to maintain the wide area beam in operation heating the at least one of the select portions while the fusing beam is applied to the at least one of the select portions.

13. The system of claim 9, wherein the supplemental heating subsystem is controlled by the computer to generate the wide area beam and begin illuminating at least one of the select portions of the powder layer prior to using the fusing beam to begin fusing the at least one of the select portions, and to maintain the wide area beam in operation heating the at least one of the select portions while the fusing beam is applied to the at least one of the select portions, and to further maintain the wide area beam directed at the at least one of the select portions for a predetermined post-fusing time interval after the fusing beam has fused the powder at the at least one of the select portions.

14. The system of claim 9, wherein the supplemental heating subsystem comprises a diode laser subsystem including a plurality of diode lasers.

15. The system of claim 9, wherein the wide area beam is generated by the supplemental heating subsystem to have a dimension which illuminates an entire area of the powder layer.

16. The system of claim 9, wherein the computer controls an intensity of the wide area beam such that the intensity is varied while the wide area beam is being used to illuminate at least one of the select portions of the powder layer.

* * * * *